United States Patent
Harduf et al.

(10) Patent No.: US 11,442,637 B1
(45) Date of Patent: Sep. 13, 2022

(54) MANAGING DRIVE SPACE AMONG DIFFERENT DATA SERVICES ENVIRONMENTS WITHIN A STORAGE SYSTEM

(71) Applicant: EMC IP Holding Company LLC, Hopkinton, MA (US)

(72) Inventors: Yuval Harduf, Yahud (IL); Peter J. McCann, Mason, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/372,824

(22) Filed: Jul. 12, 2021

(51) Int. Cl.
*G06F 3/06* (2006.01)
*G06F 9/4401* (2018.01)

(52) U.S. Cl.
CPC .......... *G06F 3/0631* (2013.01); *G06F 3/0607* (2013.01); *G06F 3/067* (2013.01); *G06F 3/0619* (2013.01); *G06F 3/0689* (2013.01); *G06F 9/4406* (2013.01)

(58) Field of Classification Search
None
See application file for complete search history.

(56) References Cited

U.S. PATENT DOCUMENTS

| | | | |
|---|---|---|---|
| 8,370,898 B1 | 2/2013 | Jackson | |
| 8,892,843 B2 * | 11/2014 | Acuna | G06F 3/0647 711/170 |
| 9,292,354 B2 | 3/2016 | Michael et al. | |
| 10,673,952 B1 | 6/2020 | Cohen et al. | |
| 2005/0044140 A1 * | 2/2005 | Urabe | G06F 3/0644 711/148 |
| 2016/0196088 A1 * | 7/2016 | Schott | G06F 3/065 707/639 |
| 2020/0117381 A1 * | 4/2020 | Deguchi | G06F 3/0653 |
| 2020/0285407 A1 * | 9/2020 | Lee | G06F 3/0613 |
| 2021/0286542 A1 | 9/2021 | Dalmatov | |

* cited by examiner

*Primary Examiner* — Kaushikkumar M Patel
(74) *Attorney, Agent, or Firm* — BainwoodHuang

(57) ABSTRACT

A technique manages drive space within a storage system having a main data services environment configured to perform data storage operations on behalf of a set of hosts and a simple data services environment configured to load the main data services environment. The technique involves, while the simple data services environment is running on the storage system, using the simple data services environment to load the main data services environment on to the storage system. The technique further involves, after the main data services environment is loaded on to the storage system, providing a drive space communication from the simple data services environment to the main data services environment. The technique further involves receiving, by the simple data services environment, allocation of drive space from the main data services environment in response to the drive space communication.

17 Claims, 6 Drawing Sheets

MANAGING DRIVE SPACE AMONG DIFFERENT DATA SERVICES ENVIRONMENTS WITHIN A STORAGE SYSTEM

BACKGROUND

A typical data storage array includes a primitive (or abridged) reliable data services implementation and a comprehensive implementation. The primitive implementation is configured to provide a primitive datapath and support certain limited functionality such as bootstrapping the comprehensive implementation, storing configuration changes, performing diagnostics, and storing performance or diagnostic trace data. The comprehensive implementation is configured to provide a primary datapath for processing input/output (I/O) requests from external host computers, as well as support a rich assortment of data storage services such as backups, archiving, snapshotting, in-line compression, deduplication, and replication.

When such a data storage array is shipped to a customer site, the primitive implementation and the comprehensive implementation typically reside in fixed predefined storage drive locations within the array. In one conventional data storage array, the primitive implementation is located on the first 50 gigabytes (GBs) of the four leftmost storage drives of the array and the comprehensive implementation occupies other available storage drive space. In another conventional data storage array, the primitive implementation is located on the first 22 GB of each storage drive of the primary enclosure and the comprehensive implementation occupies other available storage drive space.

SUMMARY

Unfortunately, there is inflexibility in the above-described conventional data storage arrays in which the primitive implementations and the comprehensive implementations reside in fixed predefined storage drive locations. Since the storage drive locations for these implementations are predefined and established, it is extremely difficult to increase the amount of storage drive space for the primitive implementation after the array ships to a customer. Nevertheless, there may be situations in which it would be useful to increase the amount of storage drive space for the primitive implementation.

For example, the conventional data storage array may be experiencing operating anomalies. In such a situation, a human administrator may wish to obtain a large detailed (i.e., extensive) trace from the array without being restricted to the original amount of storage drive space that the primitive implementation was shipped with. However, since the amount of storage drive space for the primitive implementation is fixed, the amount of trace data (e.g., the time period covered by each trace, the depth of information within each trace, etc.) is limited.

As another example, the conventional data storage array may require an upgrade. In such a situation, it may be worthwhile to temporarily augment the amount of storage drive space consumed by the primitive implementation so that the array concurrently holds both the earlier version and the new version for a period of time before committing to the upgrade (e.g., so that the array may revert back to using the earlier version if issues arise). However, due to the limited amount of storage drive space, there may not be enough storage drive space to save the earlier version during the upgrade thus removing the possibility of reverting back to the earlier version.

Moreover, it would be extremely difficult or even impractical for a human operator to manually reconfigure the storage locations for each implementation on an array. That is, to change the division of space between the primitive implementation and the comprehensive implementation on the storage drives (e.g., for an upgrade) would be at a substantial risk and time cost, and most any change would involve mass movement of data at a critical time and introduce the complex problem of handling failures during such movement.

In contrast to the above-described conventional data storage arrays in which the primitive implementations and the comprehensive implementations reside in fixed predefined storage drive locations, improved techniques are directed to managing (e.g., flexibly borrowing/lending) drive space within a storage system having a main data services environment configured to perform data storage operations on behalf of a set of hosts and a simple data services environment configured to bootstrap and otherwise support the main data services environment. With such an improved technique, the simple environment is not restricted to consuming only predefined drive space locations and may borrow drive space from the main environment as required. From the other point of view, the main environment may lend drive space to the simple environment, as well as receive back drive space that the main environment had lent the simple environment but no longer requires. Such operation enables the storage system to enjoy certain drive space flexibility and efficiencies such as the simple environment having access to a ready supply of drive space for recording detailed traces for performance analysis, debugging, etc. Additionally, such operation enables the storage system to perform complex upgrades and store multiple versions thus preserving the ability to revert back to earlier versions. Moreover, among other things, such operation enables the storage system to more effectively use drive space overall (e.g., by enabling the simple environment to borrow and return drive space from time to time).

One embodiment is directed to a method of managing drive space within a storage system having a main data services environment configured to perform data storage operations on behalf of a set of hosts and a simple data services environment configured to load the main data services environment. The method includes, while the simple data services environment is running on the storage system, using the simple data services environment to load the main data services environment on to the storage system. The method further includes, after the main data services environment is loaded on to the storage system, providing a drive space communication from the simple data services environment to the main data services environment. The method further includes receiving, by the simple data services environment, existing or new allocations of drive space from the main data services environment in response to the drive space communication.

Another embodiment is directed to data storage equipment which includes memory, and control circuitry coupled to the memory. The memory stores instructions which, when carried out by the control circuitry, cause the control circuitry to manage drive space within a storage system having a main data services environment configured to perform data storage operations on behalf of a set of hosts and a simple data services environment configured to load the main data services environment by performing a method of:

(A) while the simple data services environment is running on the storage system, using the simple data services environment to load the main data services environment on to the storage system, (B) after the main data services environment is loaded on to the storage system, providing a drive space communication from the simple data services environment to the main data services environment, and (C) receiving, by the simple data services environment, existing or new allocations of drive space from the main data services environment in response to the drive space communication.

Yet another embodiment is directed to a computer program product having a non-transitory computer readable medium which stores a set of instructions to manage drive space within a storage system having a main data services environment configured to perform data storage operations on behalf of a set of hosts and a simple data services environment configured to load the main data services environment. The set of instructions, when carried out by computerized circuitry, causes the computerized circuitry to perform a method of:

(A) while the simple data services environment is running on the storage system, using the simple data services environment to load the main data services environment on to the storage system;

(B) after the main data services environment is loaded on to the storage system, providing a drive space communication from the simple data services environment to the main data services environment; and (C) receiving, by the simple data services environment, existing or new allocations of drive space from the main data services environment in response to the drive space communication.

In some arrangements, using the simple data services environment to load the main data services environment includes, after the simple data services environment is loaded on to the storage system, performing a bootstrap operation to load the main data services environment.

In some arrangements, using the simple data services environment to load the main data services environment further includes, after the bootstrap operation is performed, running the main data services environment on the storage system to enable the main data services environment to be responsive to drive space requests from the simple data services environment.

In some arrangements, providing the drive space communication includes providing a drive space request that identifies a storage drive of the storage system and an amount of drive space to be allocated from the storage drive.

In some arrangements, providing the drive space request includes sending a request signal from the simple data services environment to the main data services environment. The request signal includes an identifier that uniquely identifies a particular storage drive among a plurality of storage drives of the storage system and an amount parameter that specifies the amount of drive space to be allocated from the particular storage drive.

In some arrangements, the plurality of storage drives of the storage system includes a set of faster access speed solid state storage devices and a set of slower access speed solid state storage devices. Additionally, the identifier identifies, as the particular storage drive, a particular slower access speed solid state storage device among the set of slower access speed solid state storage devices.

In some arrangements, the main data services environment is configured to allocate drive space from the plurality of storage drives in N gigabyte chunks, N being a positive integer. Additionally, the amount parameter specifies, as the amount of drive space, an integer multiple of N gigabyte chunks.

In some arrangements, receiving the allocation of drive space includes acquiring storage space, which was previously used by the main data services environment, from the main data services environment for subsequent use by the simple data services environment.

In some arrangements, receiving the allocation of drive space further includes, after the drive space communication is provided from the simple data services environment to the main data services environment and prior to acquiring the storage space, waiting for the main data services environment to relocate data from the storage space to other storage space.

In some arrangements, the simple data services environment is configured to utilize a simple data services environment storage space. Additionally, the main data services environment is configured to utilize a main data services environment storage space. Furthermore, acquiring the storage space from the main data services environment includes adding, as the storage space from the main data services environment, non-volatile memory that is borrowed from the main data services environment storage space to the simple data services environment storage space.

In some arrangements, the simple data services environment maintains simple data services environment metadata to manage the simple data services environment storage space. Additionally, the method further includes updating the simple data services environment metadata to enable the simple data services environment to access the non-volatile memory that is borrowed from the main data services environment storage space while the main data services environment is inoperative.

In some arrangements, the method further includes, after the simple data services environment storage space has utilized the non-volatile memory that is borrowed from the main data services environment storage space and that has been added to the simple data services environment storage space, removing the non-volatile memory from the simple data services environment storage space and returning the non-volatile memory to the main data services environment for further use by the main data services environment.

In some arrangements, the method further includes, after receiving the allocation of drive space, forming a redundant array of independent disks (RAID) extent that includes the drive space among other drive spaces to provide fault tolerance to data stored within the RAID extent in accordance with a particular RAID protection scheme.

In some arrangements, the method further includes, after receiving the allocation of drive space, writing trace data within the drive space for debugging storage system operation.

In some arrangements, the method further includes, after receiving the allocation of drive space, assigning the drive space as standby spare space for use in data recovery.

It should be understood that, in the cloud context, at least some electronic circuitry (e.g., hosts, backup sites, etc.) is formed by remote computer resources distributed over a network. Such an electronic environment is capable of providing certain advantages such as high availability and data protection, transparent operation and enhanced security, big data analysis, etc.

Other embodiments are directed to electronic systems and apparatuses, processing circuits, componentry, computer program products, and so on. Some embodiments are directed to various methods, electronic components and circuitry which are involved in managing drive space among different data services environments within a storage system.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to managing (e.g., flexibly borrowing/lending) managing drive space among different data services environments within a storage system. Along these lines, the storage system may have a main environment configured to perform data storage operations on behalf of a set of hosts and a simple environment configured to load the main environment. With the improved technique, the simple environment is not restricted to consuming only predefined drive space locations and may borrow drive space from the main environment on occasion. From the point of view of the main environment, the main environment may lend drive space to the simple environment, as well as receive back drive space that the main environment had lent the simple environment. Such operation enables the storage system to enjoy certain drive space flexibility and optimizations such as the simple environment having access to a ready supply of drive space for recording detailed traces for performance analysis, debugging, etc. Additionally, such operation enables the storage system to perform complex upgrades and maintain multiple version installs while preserving the ability to revert back to earlier versions. Moreover, such operation enables the storage system to more efficiently use drive space overall.

Figure 1:
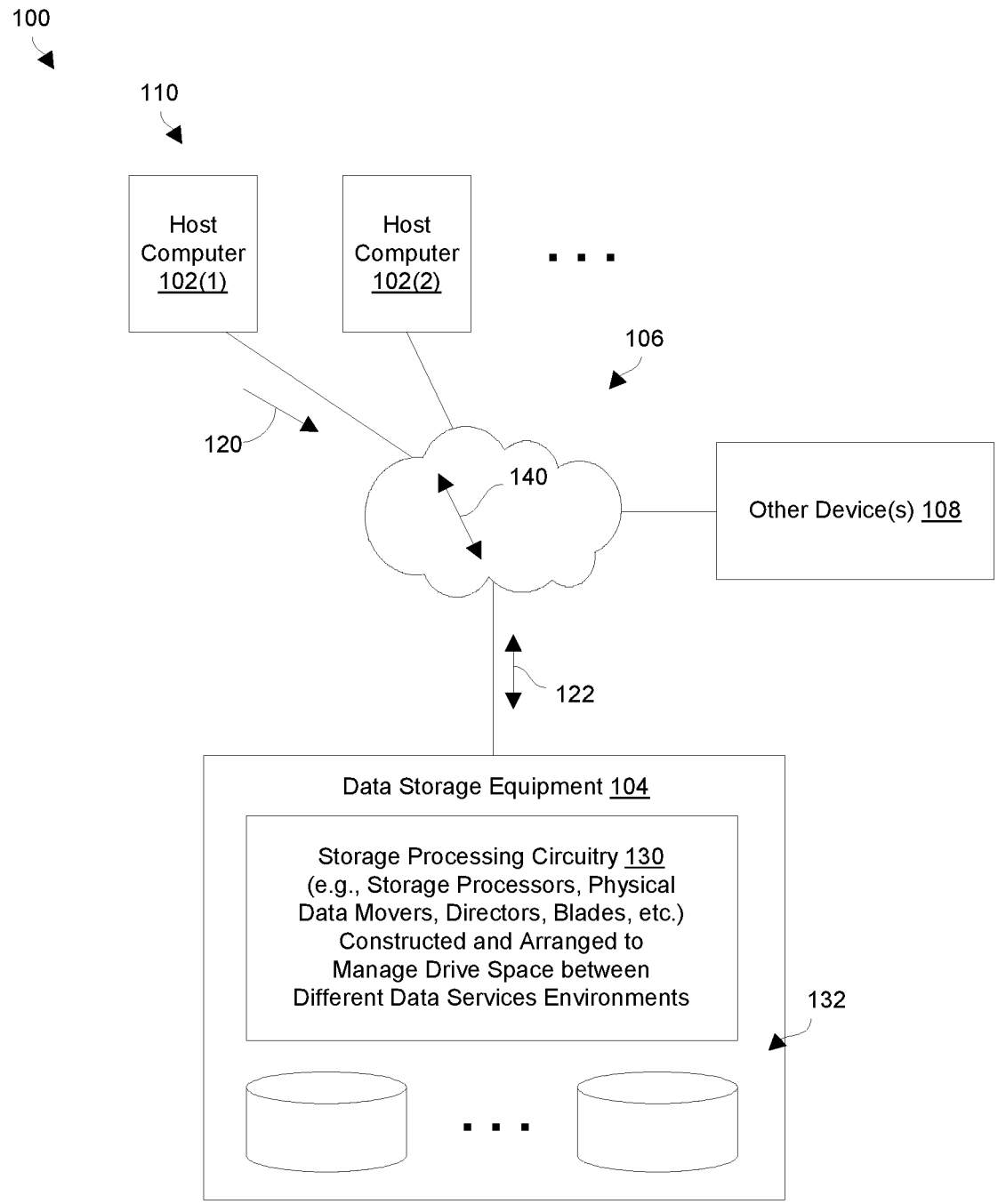
FIG. 1 is a block diagram of a storage system setting that manages drive space among different data services environments in accordance with certain embodiments.

FIG. 1 shows a storage system setting 100 that manages drive space among different data services environments in accordance with certain embodiments. The storage system setting 100 includes host computers 102(1), 102(2), . . . (collectively, host computers 102), data storage equipment 104, a communications medium 106, and perhaps other devices 108.

Each host computer 102 is constructed and arranged to perform useful work. For example, one or more of the host computers 102 may operate as a file server, a web server, an email server, an enterprise server, a database server, a transaction server, combinations thereof, etc. which provides host input/output (I/O) requests 120 to the data storage equipment 104. In this context, the host computers 102 may provide a variety of different I/O requests 120 (e.g., block and/or file based write commands, block and/or file based read commands, combinations thereof, etc.) that direct the data storage equipment 104 to richly and reliably store host data 122 within and retrieve host data 122 from storage (e.g., primary storage or main memory, secondary storage, tiered storage, combinations thereof, etc.).

The data storage equipment 104 includes storage processing circuitry 130 and storage devices 132. The storage processing circuitry 130 is constructed and arranged to respond to the host I/O requests 120 from the host computers 102 by writing data into the storage devices 132 and reading the data from the storage devices 132.

The storage processing circuitry 130 may include one or more physical storage processors (SPs) or engines, data movers, director boards, blades, I/O modules, storage device controllers, switches, other hardware, combinations thereof, and so on. The storage devices 132 provide persistent/non-volatile storage in accordance with one or more RAID protection schemes and may include one or more types of storage drives, e.g., non-volatile random access memory (NVRAM) devices, solid state drives (SSDs), hard disk drives (HDDs), combinations thereof, and so on.

In accordance with certain embodiments, at least some of the storage devices 132 provide non-volatile storage using a mapped-RAID architecture. Moreover, in accordance with certain embodiments, various physical componentry may be virtualized for additional flexibility, fault tolerance, load balancing, and so on (e.g., virtual data movers, virtual storage devices, etc.).

The communications medium 106 is constructed and arranged to connect the various components of the storage system setting 100 together to enable these components to exchange electronic signals 140 (e.g., see the double arrow 140). At least a portion of the communications medium 106 is illustrated as a cloud to indicate that the communications medium 106 is capable of having a variety of different topologies including backbone, hub-and-spoke, loop, irregular, combinations thereof, and so on. Along these lines, the communications medium 106 may include copper-based data communications devices and cabling, fiber optic devices and cabling, wireless devices, combinations thereof, etc. Furthermore, the communications medium 106 is capable of supporting LAN-based communications, SAN-based communications, cellular communications, WAN-based communications, distributed infrastructure communications, other topologies, combinations thereof, etc.

The other devices 108 represent other possible componentry of the storage system setting 100. Along these lines, the other devices 108 may include remote data storage equipment that provides data to and/or receives data from the data storage equipment 104 (e.g., replication arrays, backup and/or archiving equipment, service processors and/or management/control devices, combinations thereof, etc.).

During operation, the data storage equipment 104 performs data storage operations on behalf of the host computers 102. It should be appreciated that the storage processing circuitry 130 may further provide a variety of specialized datapath services and data storage features such as garbage collection, tiering, deduplication, compression, encryption, snapshotting, backup/archival services, replication and/or failover to other data storage equipment, data recovery, and so on. In some arrangements, the data storage equipment 104 itself may run host-based applications thus providing a platform with integrated host services.

During such operation, the data storage equipment 104 manages drive space between different data services environments. In particular, the data storage equipment 104 includes a main data services environment which provides a rich and robust datapath for processing I/O operations (e.g., host I/O requests 120). Additionally, the data storage equipment 104 includes a simple data services environment which provides a simpler datapath for processing other I/O operations (e.g., to store/analyze traces for debugging purposes, to process configuration changes such as adding/deleting port/devices/etc., and so on). During startup, the simple data services environment is responsible for loading the main data services environment (e.g., performing a bootstrapping process).

As will be explained in further detail shortly, the simple data services environment is able to borrow drive space from the main data services environment. In contrast to conventional data storage arrays that locate primitive and comprehensive implementations in fixed inflexible storage drive locations, the main data services environment is able to lend such drive space from unused (e.g., free) drive space on any available storage drive 132. Moreover, if a particular storage drive 132 currently does not have enough unused drive space due to storage of host data 122, the main data services environment has the ability to relocate the host data 122 in order to free up the drive space in order to lend that drive space to the simple data services environment.

While the simple data services environment borrows this drive space, the main data services environment refrains from further accessing the drive space. Accordingly, the simple data services environment is able to utilize the borrowed drive space for a variety of purposes, e.g., to store traces or other diagnostic data, to perform/support upgrades, to hold metadata, etc. without risk that the main data services environment will interfere with the borrowed drive space.

It should be understood that, at times, there may be situations in which it would be useful for the simple data services environment to have more drive space. For example, when the data storage equipment 104 initially ships to a customer, the simple data services environment may be provisioned with a first amount of drive space which is utilized efficiently during initial operation. However, at a later time, it may make sense to increase the amount of drive space for the simple data services environment (e.g., to enable the simple data services environment to capture a large amount of trace data for debugging/analyzing purposes, to perform a upgrade with reliably rollback flexibility, etc.).

Using the improved techniques disclosed herein, the simple data services environment is able to obtain more drive space by borrowing drive space from the main data services environment. Such borrowed drive space is not restricted to particular drive locations on the storage drives 132. Rather, the simple data services environment may send a request for drive space to the main data services environment (e.g., by identifying a particular storage space amount and a particular storage drive). The main data services environment then responds by lending the requested drive space and refraining from further accessing that drive space while the drive space is borrowed by the simple data services environment. It should be understood that the simple data services environment may borrow drive space from multiple storage drives in this manner thus obtaining access to different storage drives for implementing a particular RAID protection scheme (e.g., N-way mirroring where N is a positive integer, RAID5, RAID6, etc.).

It should be appreciated that the simple data services environment may borrow the drive space from the main data services environment for a short period of time (e.g., minutes, hours, etc.) or for a long period of time (e.g., days, weeks, indefinitely). While the simple data services environment has the drive space, the simple data services environment has control over the drive space and the main data services environment does not intrude on that drive space.

At some point, the simple data services environment may return the borrowed drive space to the main data services environment. In such a situation, the simple data services environment sends another request to the main data services environment indicating that the simple data services environment wishes to return the borrowed drive space. In response, the main data services environment takes back the borrowed drive space. At this point, the main data services environment is able to reuse the returned drive space, and the simple data services environment refrains from further directly accessing the drive space. Further details will now be provided with reference to FIGS. 2 and 3.

Figure 2:
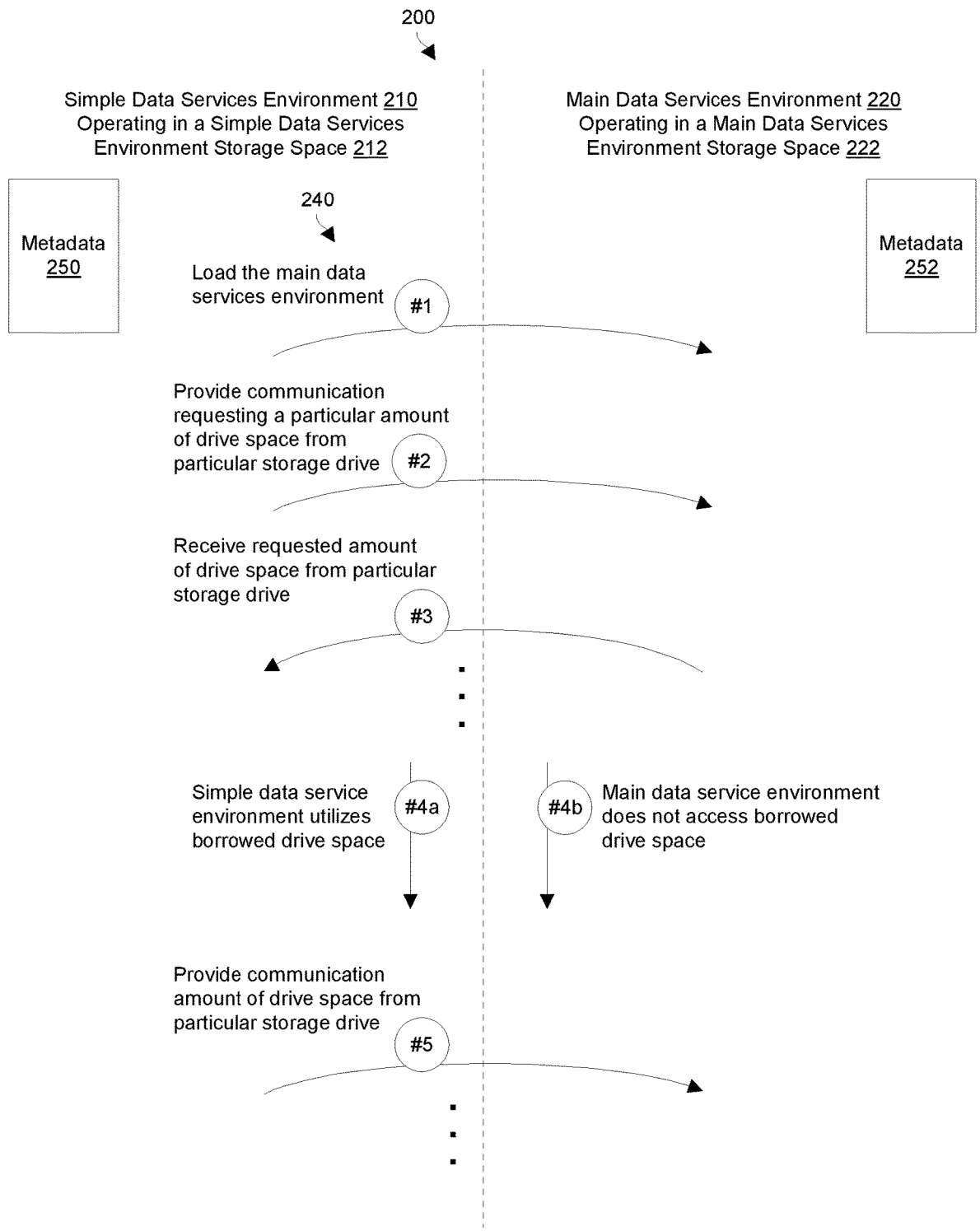
FIG. 2 is a diagram of certain storage system details in accordance with certain embodiments.
Figure 3:
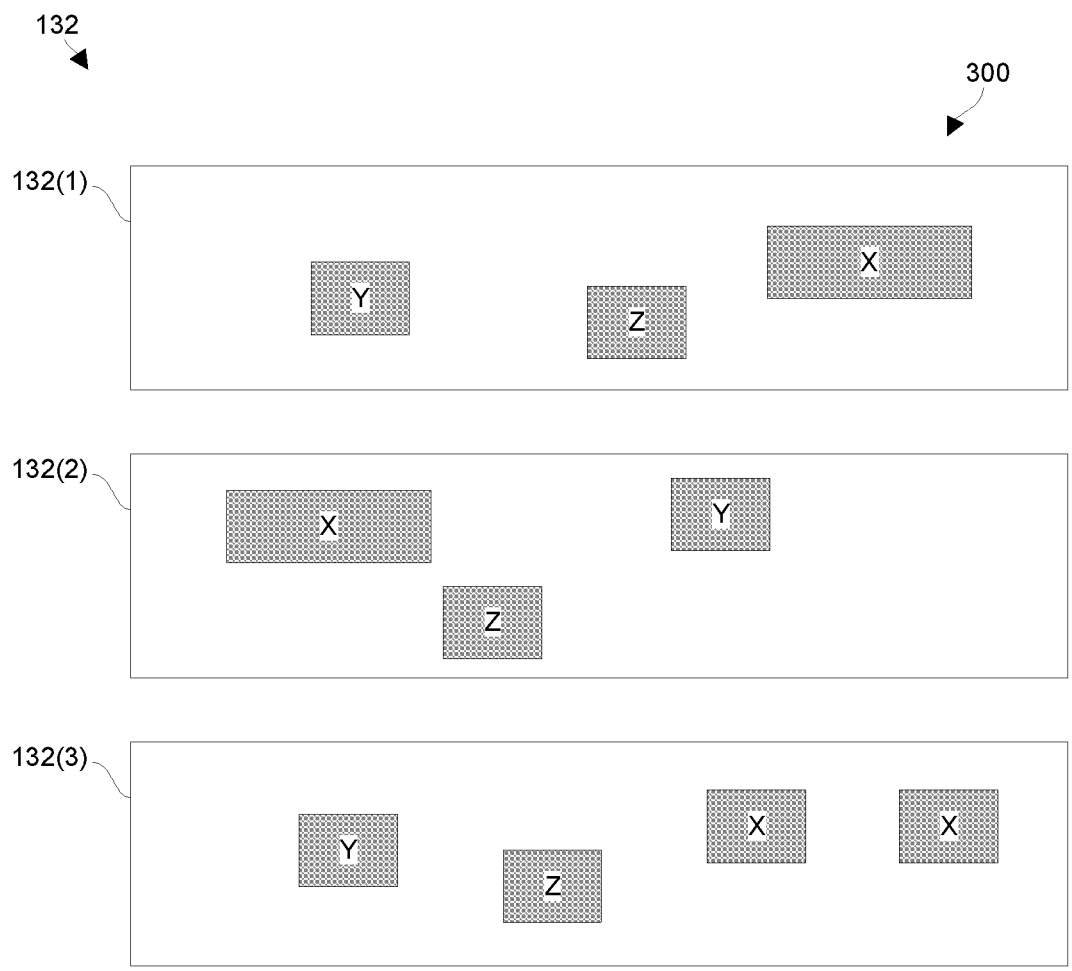
FIG. 3 is a block diagram illustrating other storage system details in accordance with certain embodiments.

FIGS. 2 and 3 show certain storage system details for the storage system setting 100 (FIG. 1) in accordance with certain embodiments. FIG. 2 shows certain drive space borrowing details in accordance with certain embodiments. FIG. 3 shows example borrowed drive spaces in accordance with certain embodiments.

As shown in FIG. 2, the storage devices 132 of the data storage equipment 104 provide drive space 200 for storing data (also see FIG. 1). In particular, a simple data services environment 210 uses a simple data services environment storage space 212 of the drive space 200. Similarly, a main data services environment 220 uses a main data services environment storage space 222 of the drive space 200.

In some arrangements, each storage space 212, 222 is a collection of individual drive space portions (or chunk spaces) from multiple storage devices 132 (also see FIG. 1). Such drive space portions may be arranged to employ one or more RAID protection schemes to protect data (e.g., a 2-way mirror, a 3-way mirror, RAID5(4+1), RAID6(4+2), etc.). In one example arrangement, the simple data services environment storage space 212 may be formed of low end SSD drive space portions arranged as a 3-way mirror while the main data services environment storage space 222 consumes drive space portions on high end SSDs (e.g., a fast storage tier), other drive space portions on the low end SSDs (e.g., a medium speed storage tier), and yet other drive space portions on HDDs (e.g., a slow storage tier).

During such use, the simple data services environment 210 refrains from accessing the drive space portions within the main data services environment storage space 222. Likewise, the main data services environment 220 refrains from accessing the drive space portions within the simple data services environment storage space 212. However, such data services environments 210, 220 may communicate with each other for various purposes such as sharing (i.e., borrowing/lending) portions of their respective storage spaces 212, 222.

Interactions 240 between the simple data services environment 210 and the main data services environment 220 result in drive space borrowing is shown in FIG. 2. Such interactions 240 may be carried out after the simple data services environment 210 has been provisioned with an initial amount of the drive space 200 for the simple data services environment storage space 212, and the main data services environment 220 has been provisioned with another initial amount of the drive space 200 for the main data services environment storage space 222.

First, the simple data services environment 210 loads the main data services environment 220 (arrow #1). Such loading may involve performance of a bootstrapping process by the simple data services environment 210 that bootstraps (e.g., begins operation of) the main data services environment 220. Once the main data services environment 220 is in operation, the main data services environment 220 is able to satisfy requests from the simple data services environment 210. Moreover, as explained earlier, the main data services environment 220 is responsible for processing I/O requests 120 from host computers 102.

Additionally, in accordance with certain embodiment, the main data services environment 220 is also able at any time to enumerate the current set of borrows/allocations that it has made for the simple data services environment 210. Along these lines, such borrows/allocations information is persisted by the main data services environment 220.

Next, the simple data services environment 210 provides a communication to the main data services environment 220 (arrow #2). The communication (e.g., a drive space request) indicates that the simple data services environment 210 wishes to borrow a particular amount of drive space from a particular storage drive 132 (FIG. 1). To this end, it should be appreciated that the simple data services environment 210 already maintains various configuration information as part of its normal functionality (e.g., to store information on storage drives, storage processors, ports, etc.). Accordingly, from this configuration information, the simple data services environment 210 may select particular amounts of drive space on particular storage devices that are well suited for certain operations.

For example, suppose that different types of drive space are available such as high end SSD drive space, low end SSD drive space, and HDD drive space. If the simple data services environment 210 needs to borrow drive space for a 3-way mirror to capture a trace or to performing an upgrade, the simple data services environment 210 may decide to acquire amounts of drive space from multiple low end SSDs since such drive space from such low end SSDs may provide an appropriate balance/combination of access speed, flexibility for data mobility/data relocation to free space if necessary, cost efficiency, and so on.

After the simple data services environment 210 provides the communication requesting drive space, the main data services environment 220 works to satisfy the request. In accordance with certain embodiments, the amount of drive space is identified by indicating a number of chunk spaces (or simply chunks). Each chunk has the same predefined amount of contiguous space (e.g., 2 GB, 4 GB, 8 GB, 16 GB, etc.) and is aligned with a natural address boundary on a storage device 132 (FIG. 1).

In some situations, the particular amount of drive space on the particular storage drive may already have enough drive space available (or free) to satisfy the request. In such a situation, the main data services environment 220 may immediately deliver the drive space to the simple data services environment 210.

However, in other situations, the particular amount of unused drive space on the particular storage drive may not be currently available to immediately satisfy the request. In such a situation, the main data services environment 220 relocates existing data from the particular storage drive elsewhere among the storage devices 132 (e.g., to one or more other storage devices).

Once the main data services environment 220 has freed enough drive space, the main data services environment 220 delivers the drive space to the simple data services environment 210 (arrow #3). Along these lines, it should be understood that the simple data services environment 210 and the main data services environment 220 may independently control the respective spaces 212, 222.

In accordance with certain embodiments, the simple data services environment 210 maintains metadata 250 identifying which chunks on the storage devices 132 belong to the simple data services environment storage space 212. Similarly, the main data services environment 220 independently maintains metadata 252 identifying which chunks on the storage devices 132 belong to the main data services environment storage space 222.

Accordingly, when the main data services environment 220 lends drive space to the simple data services environment 210, both environments 210, 220 update their respective metadata 250, 252. After such updating, the environments 210, 220 do not need to further communicate with each other when accessing their respective storage spaces 212, 222. For example, if the main data services environment 220 is down (e.g., not loaded or failed), the simple data services environment 210 is able to run properly and access all of the simple data services environment storage space 212, including borrowed drive space, in the absence of the main data services environment 220.

In accordance with certain embodiments, the metadata 252 maintained by the main data services environment 220 is considered "truth" and relied upon by both the main data services environment 220 and the simple data services environment 210 when the main data services environment 220 is available. In these embodiments, if the main data services environment 220 is unavailable (e.g., the main datapath is down or non-startable), the simple data services environment 210 is then able to access its own metadata 250.

In some arrangements, the simple data services environment 210 and the main data services environment 220 maintains consistency between some or all of the metadata 250, 252 from time to time. Along these lines, the metadata 250 may be realigned/adjusted/matched/verified/etc. with the metadata 252 periodically, at upon certain events (e.g., at startup, during borrowing and/or return operations), combinations thereof, and so on. It should be appreciated that maintaining the metadata 252 of the main data services environment 220 as a single source of "truth" (e.g., where the metadata 250 is made to conform with the metadata 252) prevents error scenarios (e.g., inconsistencies if a failure occurs during borrowing or returning storage space or when storage drives are added/removed while the system is down, etc.).

It should be understood that the simple data services environment 210 may further communicate with the main data services environment 220 to borrow more drive space (e.g., see the ellipsis after arrow #3). For example, the simple data services environment 210 sends additional communications to borrow further chunks from other storage devices to form a RAID structure (e.g., a 2-way mirror, a 3-way mirror, a RAID extent or Uber implementing RAIDS or RAIDS, etc.). To this end, the above-described communications (arrows #2 and #3) are repeated to enable the simple data services environment 210 to borrow additional chunks.

By way of example, FIG. 3 shows three storage devices 132(1), 132(2), and 132(3) of the data storage equipment 104 (FIG. 1). Via communication iterations between the simple data services environment 210 and the main data services environment 220 as described above (e.g., see arrows #2 and #3 in FIG. 2), the simple data services environment 210 is able to borrow multiple chunks 300 of drive space from the main data services environment 220.

For example, via multiple requests for drive space, the simple data services environment 210 may borrow two chunks 300 from each of the three storage devices 132(1), 132(2), and 132(3) (boxes labeled "X" in FIG. 3) for use in creating or extending a 3-way mirror. Additionally, the simple data services environment 210 may borrow an additional chunk 300 from each of the three storage devices 132(1), 132(2), and 132(3) (boxes labeled "Y" in FIG. 3) for the 3-way mirror. Furthermore, the simple data services environment 210 may borrow yet another chunk 300 from each of the three storage devices 132(1), 132(2), and 132(3) (boxes labeled "Z" in FIG. 3) for construction of the 3-way mirror where each mirror includes resides on one of the storage devices 132 and includes borrowed drive spaces X, Y, and Z.

It should be appreciated that each chunk 300 is a range of contiguous drive space memory on a particular storage device 132. However, as shown in FIG. 3, the chunks 300 do not need to be adjacent to each other. The ability to utilize distributed chunks 300 that do not need to be adjacent to each other is achieved via logical to physical mappings. Moreover, in accordance with certain embodiments, the simple data services environment 210 and the main data services environment 220 may utilize standard RAID services (e.g., the mdadm Linux utility) to implement particular RAID protection schemes using the borrowed chunks 300.

Moreover, it should be understood that the chunks 300 lent by the main data services environment 220 may reside anywhere on the storage devices 132. That is, the chunks 300 are not required to reside at the beginning, end or at certain predefined locations within the storage devices 132. Rather, as illustrated in FIG. 3, to satisfy a drive space request for an amount of drive space from a particular storage device 132, the main data services environment 220 may offer one or more chunks from anywhere on the particular storage device 132 as long as the one or more chunks 300 are from the main data services environment storage space 222, i.e., one or more chunks 300 currently under its control.

Once the simple data services environment 210 borrows the drive space from the main data services environment 220, the simple data services environment 210 is able to access the borrowed drive space (arrow #4a). In particular, the simple data services environment 210 has updated its metadata 250 which now indicates that the borrowed drive space is part of the simple data services environment storage space 212 and that the simple data services environment 210 has control over the borrowed drive space. Accordingly, the simple data services environment 210 may write data to and read data from the borrowed drive space. Moreover, in accordance with certain embodiments, the simple data services environment 210 may utilize various lower level services to manage and maintain the borrowed drive space (e.g., garbage collection, compression, deduplication, RAID protection, combinations thereof, etc.).

However, while the simple data services environment 210 borrows the drive space from the main data services environment 220, the main data services environment 220 refrains from accessing the borrowed drive space. That is, the main data services environment 220 has updated its metadata 252 which now indicates that the main data services environment 220 no longer has control over the borrowed drive space. Accordingly, the main data services environment 220 is only able to access drive space within the main data services environment storage space 222 (arrow #4b).

It should be appreciated that the simple data services environment 210 may continue to borrow the drive space from the main data services environment 220 indefinitely. However, at some point, the simple data services environment 210 may return the borrowed drive space to the main data services environment 220.

To return a portion of the borrowed drive space, the simple data services environment 210 communicates with the main data services environment 220 (arrow #5). Such communication may involve the simple data services environment 210 sending a request to return the portion to the main data services environment 220. Additionally, such communication may involve the simple data services environment 210 receiving confirmation that the main data services environment 220 has accepted back the drive space.

Multiple portions of borrowed drive space may be returned to the main data services environment 220 in this manner (e.g., see the ellipsis after arrow #5). Such return of borrowed drive space enables the data storage equipment 104 to make efficient use of the drive space (e.g., via shifting amounts of drive space between the different environments 210, 220 as needed) thus alleviating the need to increase the overall capacity of the drive space 200.

During this process, the simple data services environment 210 updates its metadata 250 to reflect the drive space having been returned to the main data services environment 220. Likewise, the main data services environment 220 updates its metadata 252 to reflect the drive space is again part of the main data services environment storage space 222. Accordingly, the simple data services environment 210 now refrains from further accessing the returned drive space, and the main data services environment 212 is now able to access the returned drive space (e.g., to store data).

As mentioned above, the simple data services environment 210 and the main data services environment 212 are able to communicate with each other when both environments are available. Along these lines, the simple data services environment 210 may acquire new storage space allocations from the main data services environment 212 (e.g., at system installation time, as storage devices fail and are replaced, etc.). Additionally, the simple data services environment 210 may acquire information on existing storage space allocations from the main data services environment 212 (e.g., to determine what existing allocations have been made already, etc.). In some arrangements, the simple data services environment 210 and the main data services environment 212 communicate via a protocol or application programming interface (API) to perform such storage space operations (e.g., allocate, return, and query). Further details will now be provided with reference to FIG. 4.

Figure 4:
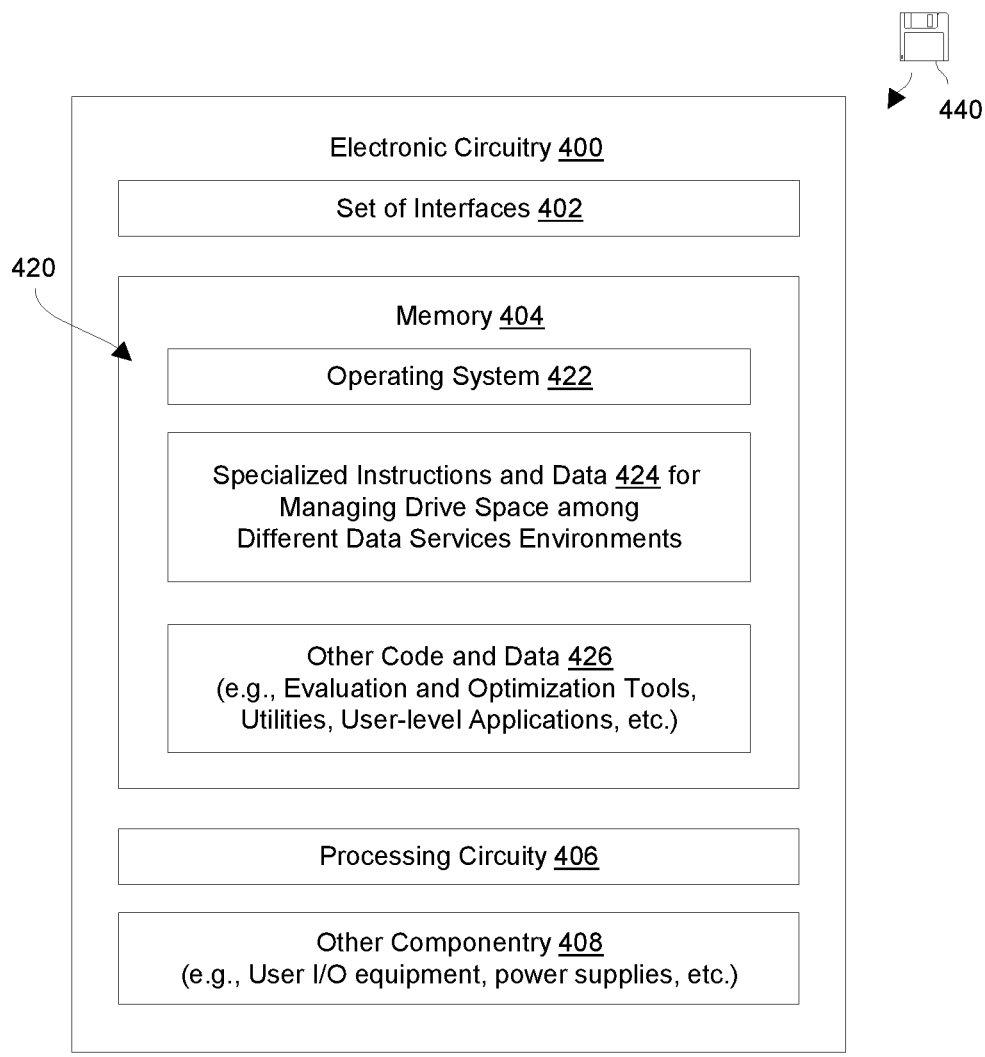
FIG. 4 is a block diagram of electronic circuitry which is suitable for use within the storage setting of FIG. 1 in accordance with certain embodiments.

FIG. 4 is a block diagram of electronic circuitry 400 which is suitable for use within the storage setting 100 of FIG. 1 in accordance with certain embodiments. Such electronic circuitry 400 may form at least a portion of the storage processing circuitry 130 of the data storage equipment 104. As shown in FIG. 4, the electronic circuitry 400 includes a set of interfaces 402, memory 404, and processing circuitry 406, and other circuitry (or componentry) 408.

The set of interfaces 402 is constructed and arranged to connect the electronic circuitry 400 to the communications medium 106 (also see FIG. 1) to enable communications with other devices of the storage system setting 100 (e.g., the host computers 102). Such communications may be IPbased, SAN-based, cellular-based, cable-based, fiber-optic based, wireless, cloud-based, combinations thereof, and so on.

Accordingly, the set of interfaces 402 may include one or more host interfaces (e.g., a computer network interface, a fibre-channel interface, etc.), one or more storage device interfaces (e.g., a host adapter or HBA, etc.), and other interfaces. As a result, the set of interfaces 402 enables the electronic circuitry 400 to robustly and reliably communicate with other external apparatus.

The memory 404 is intended to represent both volatile storage (e.g., DRAM, SRAM, etc.) and non-volatile storage (e.g., flash memory, magnetic memory, etc.). The memory 404 stores a variety of software constructs 420 including an operating system 422, specialized instructions and data 424, and other code and data 426. The operating system 422 refers to particular control code such as a kernel to manage computerized resources (e.g., processor cycles, memory space, etc.), drivers (e.g., an I/O stack), and so on. The specialized instructions and data 424 refers to particular instructions for managing drive space between different data services environments of a storage system (also see FIGS. 2 and 3). In some arrangements, the specialized instructions and data 424 is tightly integrated with or part of the operating system 422 itself. The other code and data 426 refers to applications and routines to provide additional operations and services (e.g., performance measurement tools, etc.), user-level applications, administrative tools, utilities, and so on.

The processing circuitry 406 is constructed and arranged to operate in accordance with the various software constructs 420 stored in the memory 404. As will be explained in further detail shortly, the processing circuitry 406 executes the operating system 422 and the specialized code 424 to form specialized circuitry that robustly and reliably manages host data on behalf of a set of hosts 102 (also see FIG. 1). Such processing circuitry 406 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on.

In the context of one or more processors executing software, a computer program product 440 is capable of delivering all or portions of the software constructs 420 to the electronic circuitry 400. In particular, the computer program product 440 has a non-transitory (or non-volatile) computer readable medium which stores a set of instructions that controls one or more operations of the electronic circuitry 400. Examples of suitable computer readable storage media include tangible articles of manufacture and apparatus which store instructions in a non-volatile manner such as DVD, CD-ROM, flash memory, disk memory, tape memory, and the like.

The other componentry 408 refers to other hardware of the electronic circuitry 400. Along these lines, the electronic circuitry 400 may include special user I/O equipment (e.g., a service processor, a workstation, etc.), power supplies and battery backup units, auxiliary apparatuses, other specialized data storage componentry, etc.

It should be understood that the specialized circuitry formed by the processing circuitry 406 operating in accordance with the software constructs 420 enables the electronic circuitry 400 to manage drive space among different data services environments within a storage system. For example, the processing circuitry 406 operating in accordance with some of the specialized instructions and data 424 may provide the simple data services environment 210. Additionally, the processing circuitry 406 operating in accordance with other specialized instructions and data 424 may provide the main data services environment 220.

It should be further understood that certain portions of the electronic circuitry 400 may reside together to form one or more storage controllers (or storage processors). In accordance with certain embodiments, the electronic circuitry 400 forms multiple storage controller devices for fault tolerance and/or load balancing purposes. Further details will now be provided with reference to FIGS. 5 and 6.

Figure 5:
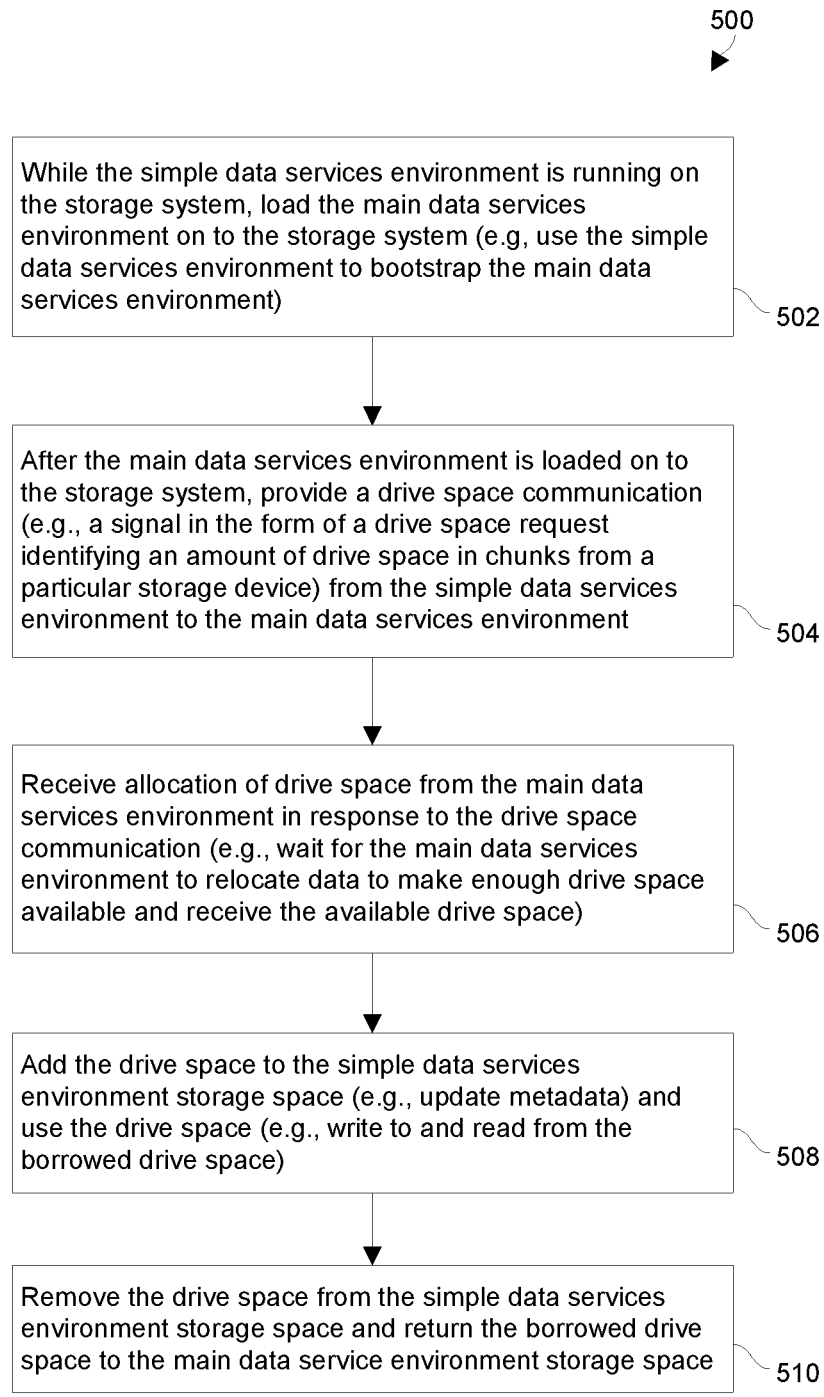
FIG. 5 is a flowchart illustrating certain operational details in accordance with certain embodiments.
Figure 6:
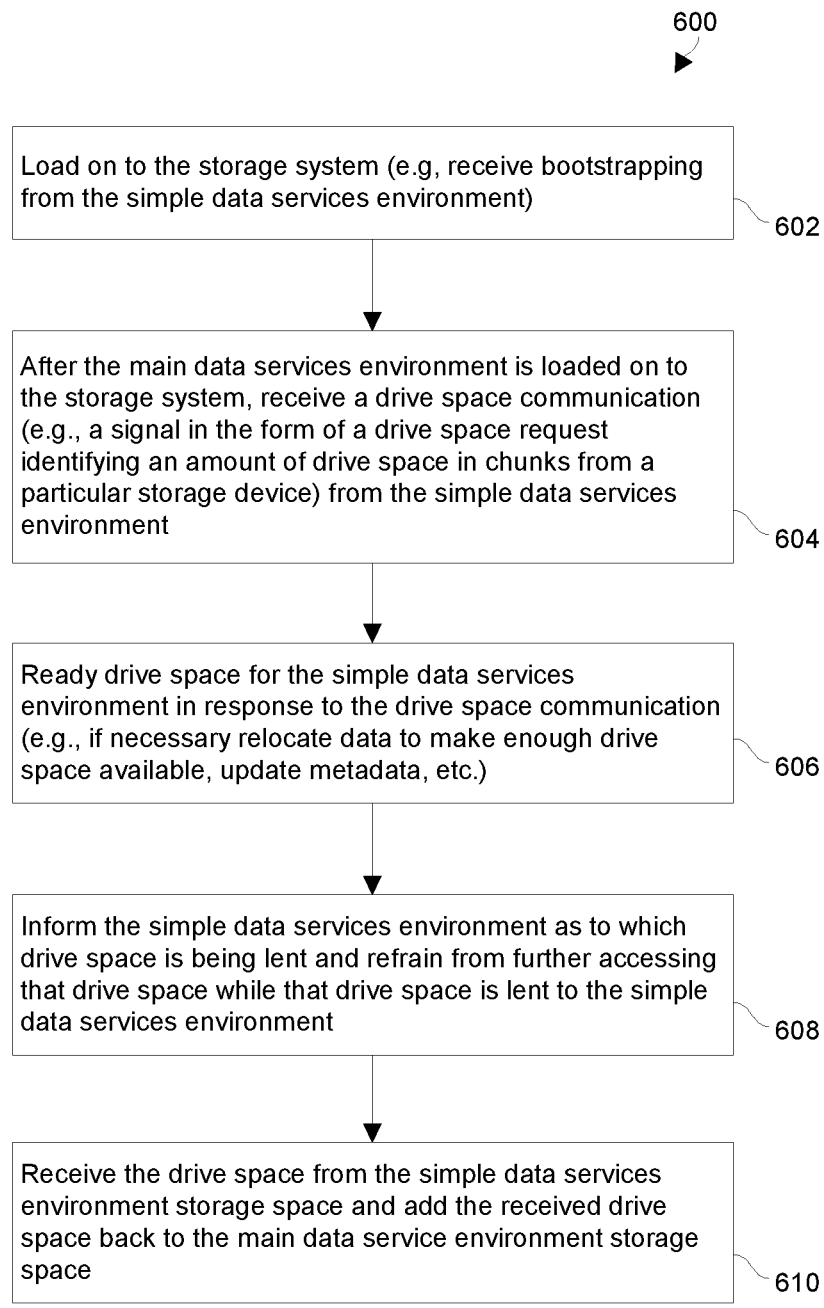
FIG. 6 is a flowchart illustrating other operational details in accordance with certain embodiments.

FIGS. 5 and 6 show certain operational details of a storage system having a main data services environment configured to perform data storage operations on behalf of a set of hosts and a simple data services environment configured to load the main data services environment. FIG. 5 shows a procedure 500 which is performed by the simple data services environment when borrowing drive space from the main data services environment. FIG. 6 shows another procedure 600 which is performed by the main data services environment when lending drive space to the simple data services environment.

With attention on FIG. 5, at 502 of the procedure 500, while the simple data services environment is running on the storage system, the simple data services environment loads the main data services environment on to the storage system. Along these lines, the simple data services environment may perform a bootstrapping operation that makes the main data services environment operational.

At 504, after the main data services environment is loaded on to the storage system, the simple data services environment provides a drive space communication from the simple data services environment to the main data services environment. As explained earlier in connection with FIGS. 2 and 3, such a communication (e.g., a request signal) may be in the form of a drive space request that identifies a particular amount of drive space (e.g., N chunks) of a particular storage device.

At 506, the simple data services environment receives allocation of drive space from the main data services environment in response to the drive space communication. In some situations, the simple data services environment may need to wait for the main data services environment to relocate data from the drive space to other drive space. Then, the main data services environment refrains from accessing the drive space that has been lent to the simple data services environment.

At 508, the simple data services environment updates metadata to reflect control over the borrowed drive space. Along these lines, the simple data services environment may maintain a list of chunks belonging to a simple data services environment drive space and add chunk identifiers that identify the new chunks to the list. The simple data services environment then uses the borrowed drive space, e.g., implements a RAID data protection scheme, collects/evaluates trace data, performs an upgrade, performs other operations that write data to and/or read data from the borrowed drive space, combinations thereof, and so on.

At 510, the simple data services environment returns the borrowed drive space to the main data services environment. Along these lines, the simple data services environment may provide a return request to the main data services environment, and the environments coordinate processing of the return request (e.g., updating respective chunk lists) so that the main data services environment may further use that drive space while the simple data services environment refrains from further using that drive space. For example, the chunks are removed from the list of chunks managed by the simple data services environment and added to the list of chunks managed by the main data services environment.

From the perspective of the main data services environment and with attention on FIG. 6, at 602 of the procedure 600, while the simple data services environment is running on the storage system, the main data services environment loads on to the storage system. Along these lines, the main data services environment receives bootstrapping from the simple data services environment.

At 604, after the main data services environment is loaded on to the storage system, the main data services environment receives a drive space communication from the simple data services environment. As explained earlier in connection with FIGS. 2 and 3, such a communication (e.g., a request signal) may be in the form of a drive space request that identifies a particular amount of drive space (e.g., N chunks) of a particular storage device.

At 606, the main data services environment readies drive space for the simple data services environment in response to the drive space communication. In some situations, the simple data services environment may need to relocate data on the particular storage device to make enough unused drive space on the particular storage device (i.e., without such relocation the data could be lost). Additionally, the main data services environment updates metadata that it uses to identify a main data services environment drive space.

Such a main data services environment drive space may be identified using a list of chunks, and the main data services environment removes (or marks) the chunks being lent to the simple data services environment from the list.

At 608, the main data services environment provides allocation of the drive space to the simple data services environment. In particular, the main data services environment informs the simple data services environment which chunks are being lent to the simple data services environment and then refrains from further accessing the drive space while the chunks are lent to the simple data services environment.

At 610, the main data services environment receives back the borrowed drive space from the simple data services environment. Along these lines, the simple data services environment may provide a return request to the main data services environment, and the environments coordinate processing of the return request (e.g., updating respective chunk lists) so that the main data services environment may further use that drive space and the simple data services environment refrains from further using that drive space. For example, the chunks are removed from the list of chunks managed by the simple data services environment and added back to the list of chunks managed by the main data services environment.

As described above, improved techniques are directed to managing drive space 200 within a storage system having a main environment 220 configured to perform data storage operations on behalf of a set of hosts and a simple environment 210 configured to load the main environment 220. With such an improved technique, the simple environment 210 is not restricted to consuming only predefined drive space locations and may borrow drive space from the main environment 220 on occasion, or for indefinite periods of time. From the other point of view, the main environment 220 may lend drive space to the simple environment 210, as well as receive back drive space that the main environment 220 had lent the simple environment 210. Such operation enables the storage system to enjoy certain drive space flexibility and efficiencies such as the simple environment having access to a ready supply of drive space for recording detailed traces for performance analysis, debugging, etc. Additionally, such operation enables the storage system to perform complex upgrades and store multiple versions thus preserving the ability to revert back to earlier versions. Moreover, among other things, such operation enables the storage system to more effectively use drive space overall.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the storage system setting 100 such as one or more host computers 102 and/or one or more other devices 108 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

It should be understood that modern highly available storage systems (or "arrays") are very complex and provide rich and varied data services, both to external storage users, and internal ("within the array") storage users.

This complexity and richness expand the possible set of problems with these data services. Situations can exist where these data services simply cannot be started up (without application of a diagnostic/repair process), or can only be partially started up (for example users can read stored data, but not write it), or can exhibit problems that can only be diagnosed with large amounts of saved 'trace' data.

For these purposes, many modern storage systems essentially have two distinct highly available data services implementations:

1) a comprehensive implementation for most uses (complex, high-scale, feature-rich)

2) a primitive implementation (low-scale, low-complexity) existing for purposes of system bootstrap, storage of debugging traces, storage of core configuration information, and support of minimal configuration/administrative services ("control path", "management GUI"), even when the comprehensive implementation is cannot be started or is degraded.

This "dual data services" scheme is well organized and enables great freedom in the development and evolution of the comprehensive data services implementation. The storage users that need the comprehensive data services implementation speed, scale, and features use it, and those (generally internal) users that must bootstrap the system, and/or operate without the comprehensive data services implementation being fully functional, use the primitive data services implementation.

However, this dual data services scheme presents a serious challenge around where the actual on-drive raw data lives, for each data service.

The comprehensive implementation needs to host its data on the so-called "backend" physical drives that are shared by the multiple nodes (computing elements) that make up the storage system, as all such data must be accessible even when one "node" is not functioning.

The primitive implementation has the same requirements (albeit on a smaller scale) in terms of where its data must live.

So, both implementations must share the same backend physical drive space.

A traditional means of handling this space sharing requirement is through some sort of relatively static fixed division-of-drive-space scheme. The downside of these schemes is that they are inflexible.

In one conventional approach, there is a "fixed division of drive space". In particular, the primitive implementation gets the first 22 GB of space on each backend drive located in a certain physical location in the system (say the primary system chassis), and the comprehensive implementation gets the remainder of these drives, and all of drives located elsewhere.

In one conventional approach, the leftmost four slots have a special drive format. That is, the primitive implementation gets the first 50 GB of the leftmost 4 drive slots of the physical system chassis, the comprehensive implementation gets the remainder of those 4 drives, and of drives located elsewhere.

Any fixed division of space on individual drives presents serious barriers to changing that division in the future. Additionally, any fixed division of space also presents waste problems as there may be (for example) 6 drives in one system at install time, and 23 in another and the same raw usable drive space is needed for the primitive implementation in both cases, so enough space must be reserved per drive to accommodate all primitive implementation space usage in both cases—probably wasting significant unused space in the 23-drive case.

Alternatively, configuring a special subset of drives (for example located in the leftmost four slots in the physical chassis) with a distinct different drive format, that provide additional reserved space for the primitive implementation, leads to restrictions on the use or maintenance of those slots, mobility of these special drives to other slots or drive enclosures, and general customer confusion and pitfalls.

Lastly, is not really feasible either to change this type of division of space between the primitive and comprehensive data services on drives at (say) system upgrade time without substantial risk and time cost, as most any change will involve mass movement of data at a critical time between both implementations, introducing the complex problem of handling failures during such movement.

Instead, in accordance with certain improved techniques disclosed herein, there is an alternate and (ultimately much simpler) solution to the problem. In accordance with certain embodiments, only a relatively small (insignificant by modern standards) amount of space is reserved for the primitive data services implementation on all normal drives in the system, regardless of type or location.

This relatively small amount of space is used for purposes of hosting the basic system bootstrap and core configuration data features of the primitive data services implementation.

The primitive and comprehensive data services implementation cooperate in an well-defined, dynamic, and easy to understand way, to allow the primitive data services world to obtain (via "persistent chunk borrowing") raw drive space from the comprehensive data services would on an as-needed when-needed basis, that is adjusted as needed over time as drives "come and go", or as the space needs of the primitive implementation grow over time.

In other words, the "larger in size" drive space needs of the primitive data services implementation are "borrowed" in a flexible and dynamic way from the space managed by the comprehensive data services implementation.

In effect the comprehensive implementation is responsible for all drive space management, i.e. has "primacy" in this aspect, but each implementation independently manages its own data robustness (uses its own RAID) and orchestration (drive failure and replacement handling.

The major advantage of this is—there is (aside from the small reserved drive space) no fixed division of space on individual drives. The only new requirement is that the comprehensive data services implementation be able to—on demand—take a "chunk" of its managed drive space—from an appropriate drive—and agree to "free it up" and never touch it again—presenting it to the primitive data services implementation as a "borrowed" chunk, that the primitive system can use for its drive space needs as it sees fit.

If the comprehensive data services implementation cannot, for any reason, start and run—or can only partially start and run—the primitive data services implementation can simply refer to a database/cache it maintains of where all such "borrowed" drive chunks live—and provide its services regardless of the state of the comprehensive implementation.

Now obviously this borrowing scheme cannot significantly change state (to, for example, create new borrowings, handle drive loss or replacement) if the comprehensive data services implementation is not minimally functional—but this is not a serious restriction as even without this scheme, drive loss or replacement cannot be handled fully if the comprehensive data services implementation is not functional (on at least one node)—as it must move raw data around ("RAID rebuild") to handle drive loss—so this scheme adds no additional burden or restriction here.

In accordance with certain embodiments, a fully implemented this scheme allows for:
- a single physical drive format in all cases (which is greatly simplifying)
- two almost completely independent data services implementations sharing the same drives in a flexible way
- the primitive data services implementation to change its drive space size usage over time, if needed
- minimization of drive space waste (space necessarily reserved for the primitive data services implementation—but not actively used)
- a very simplistic "tie" between the primitive and comprehensive data services implementation—the comprehensive one simply needs to (when available) respond to requests to 'borrow' a chunk when needed, enumerated borrowed chunks on demand, and accept the return of a borrowed chunk—otherwise the two implementations can be completely independent and are free to evolve independently
- relatively simple failure handling—the only significant failure scenario new to this scheme is—what happens when the system fails when the primitive data services implementation is attempting to borrow a new chunk from the comprehensive implementation—and since the primitive implementation maintains its own independent database/cache of such borrowings—any partial/failed borrow attempt can simply be (as part of failure recovery) detected, rolled-back, cleaned up, and retried
- the primitive data services implementation to create, use, and return any amount of "temporary" storage for, say, special debug situations, or special upgrade situations (for example where an internal database needs to be upgraded—so additional temporary storage to preserve a "rollback copy" of the database is needed)—all that is required is that the comprehensive data services implementation is functional enough to handle a borrow or return request on at least one "node".

In accordance with certain embodiments, the scale of "borrowings" in this scheme is (compared to the scale of the comprehensive data services implementation) quite small—e.g., on the order of 200 borrowed chunks, so the databases/caches needed in both the comprehensive and primitive data services implementations are not significant burdens. The rate of change of these databases/caches is small—as after initial system installation they are only changed when drives are lost or replaced, so their implementations can be very simple.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

For example, in accordance with certain embodiments, the drive space being managed was identified in terms of chunk spaces (e.g., contiguous 4 GB portions of drive space which are address aligned). However, other techniques are suitable for identifying drive spaces such as via other portion sizes, ranges (e.g., beginning and ending addresses), page identifiers, starting addresses and offsets, segments, combinations thereof, and so on. Such modifications and enhancements are intended to belong to various embodiments of the disclosure.

What is claimed is:

1. A method of managing drive space within a storage system having a main data services environment configured to perform data storage operations on behalf of a set of hosts and a simple data services environment configured to load the main data services environment, the method comprising:
   while the simple data services environment is running on the storage system, using the simple data services environment to load the main data services environment on to the storage system;
   after the main data services environment is loaded on to the storage system, providing a drive space communication from the simple data services environment to the main data services environment; and
   receiving, by the simple data services environment, allocation of drive space from the main data services environment in response to the drive space communication.

2. A method as in claim 1 wherein using the simple data services environment to load the main data services environment includes:
   after the simple data services environment is loaded on to the storage system, performing a bootstrap operation to load the main data services environment.

3. A method as in claim 2 wherein using the simple data services environment to load the main data services environment further includes:
   after the bootstrap operation is performed, running the main data services environment on the storage system to enable the main data services environment to be responsive to drive space requests from the simple data services environment.

4. A method as in claim 1 wherein providing the drive space communication includes:
   providing a drive space request that identifies a storage drive of the storage system and an amount of drive space to be allocated from the storage drive.

5. A method as in claim 4 wherein providing the drive space request includes:
   sending a request signal from the simple data services environment to the main data services environment, the request signal including an identifier that uniquely identifies a particular storage drive among a plurality of storage drives of the storage system and an amount parameter that specifies the amount of drive space to be allocated from the particular storage drive.

6. A method as in claim 5 wherein the plurality of storage drives of the storage system includes a set of faster access speed solid state storage devices and a set of slower access speed solid state storage devices; and
   wherein the identifier identifies, as the particular storage drive, a particular slower access speed solid state storage device among the set of slower access speed solid state storage devices.

7. A method as in claim 5 wherein the main data services environment is configured to allocate drive space from the plurality of storage drives in N gigabyte chunks, N being a positive integer; and
   wherein the amount parameter specifies, as the amount of drive space, an integer multiple of N gigabyte chunks.

8. A method as in claim 1 wherein receiving the allocation of drive space includes:
   acquiring storage space, which was previously used by the main data services environment, from the main data services environment for subsequent use by the simple data services environment.

9. A method as in claim 8 wherein receiving the allocation of drive space further includes:
   after the drive space communication is provided from the simple data services environment to the main data services environment and prior to acquiring the storage space, waiting for the main data services environment to relocate data from the storage space to other storage space.

10. A method as in claim 8 wherein the simple data services environment is configured to utilize a simple data services environment storage space;
    wherein the main data services environment is configured to utilize a main data services environment storage space; and
    wherein acquiring the storage space from the main data services environment includes:
        adding, as the storage space from the main data services environment, non-volatile memory that is borrowed from the main data services environment storage space to the simple data services environment storage space.

11. A method as in claim 10 wherein the simple data services environment maintains simple data services environment metadata to manage the simple data services environment storage space; and
    wherein the method further comprises:
        updating the simple data services environment metadata to enable the simple data services environment to access the non-volatile memory that is borrowed from the main data services environment storage space while the main data services environment is inoperative.

12. A method as in claim 10, further comprising:
after the simple data services environment storage space has utilized the non-volatile memory that is borrowed from the main data services environment storage space and that has been added to the simple data services environment storage space, removing the non-volatile memory from the simple data services environment storage space and returning the non-volatile memory to the main data services environment for further use by the main data services environment.

13. A method as in claim 1, further comprising:
after receiving the allocation of drive space, forming a redundant array of independent disks (RAID) extent that includes the drive space among other drive spaces to provide fault tolerance to data stored within the RAID extent in accordance with a particular RAID protection scheme.

14. A method as in claim 1, further comprising:
after receiving the allocation of drive space, writing trace data within the drive space for debugging storage system operation.

15. A method as in claim 1, further comprising:
after receiving the allocation of drive space, assigning the drive space as standby spare space for use in data recovery.

16. Data storage equipment, comprising:
memory; and
control circuitry coupled to the memory, the memory storing instructions which, when carried out by the control circuitry, cause the control circuitry to manage drive space within a storage system having a main data services environment configured to perform data storage operations on behalf of a set of hosts and a simple data services environment configured to load the main data services environment by performing a method of:
while the simple data services environment is running on the storage system, using the simple data services environment to load the main data services environment on to the storage system,
after the main data services environment is loaded on to the storage system, providing a drive space communication from the simple data services environment to the main data services environment, and
receiving, by the simple data services environment, allocation of drive space from the main data services environment in response to the drive space communication.

17. A computer program product having a non-transitory computer readable medium which stores a set of instructions to manage drive space within a storage system having a main data services environment configured to perform data storage operations on behalf of a set of hosts and a simple data services environment configured to load the main data services environment; the set of instructions, when carried out by computerized circuitry, causing the computerized circuitry to perform a method of:
while the simple data services environment is running on the storage system, using the simple data services environment to load the main data services environment on to the storage system;
after the main data services environment is loaded on to the storage system, providing a drive space communication from the simple data services environment to the main data services environment; and
receiving, by the simple data services environment, allocation of drive space from the main data services environment in response to the drive space communication.

* * * * *